Oct. 29, 1935.     R. S. BLAIR     2,019,435
PYROPHORIC LIGHTER
Filed Dec. 12, 1932     3 Sheets-Sheet 1
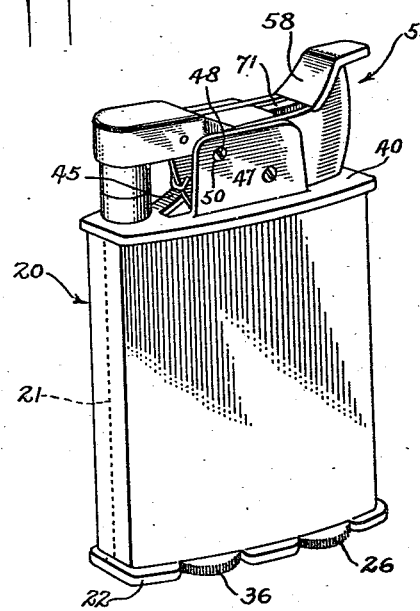
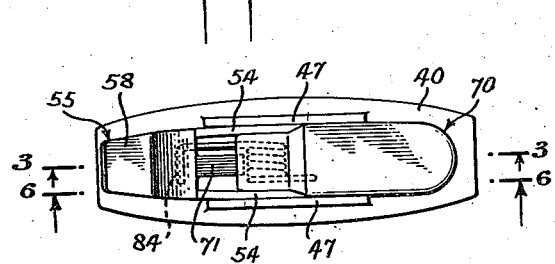
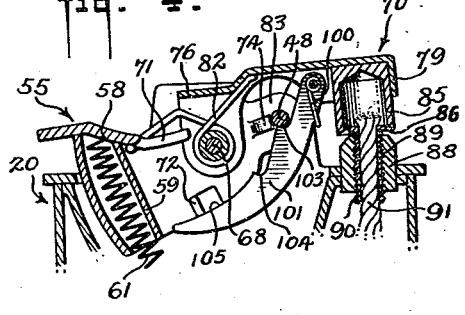
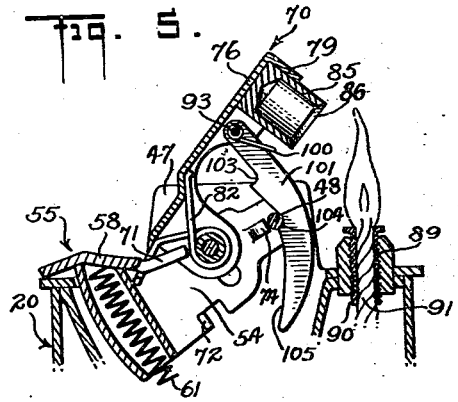
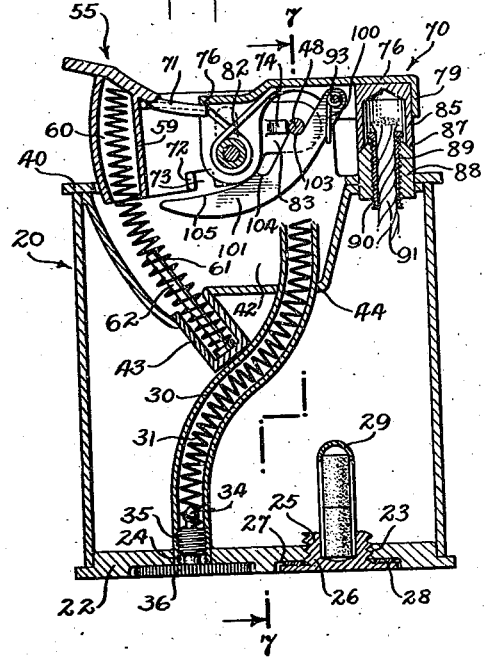
INVENTOR
Robert S. Blair
BY
ATTORNEYS Oct. 29, 1935.　　　　R. S. BLAIR　　　　2,019,435
PYROPHORIC LIGHTER
Filed Dec. 12, 1932　　　　3 Sheets-Sheet 2
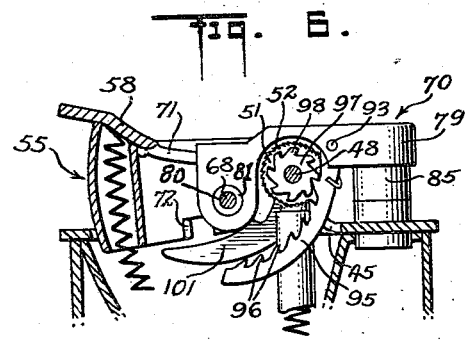
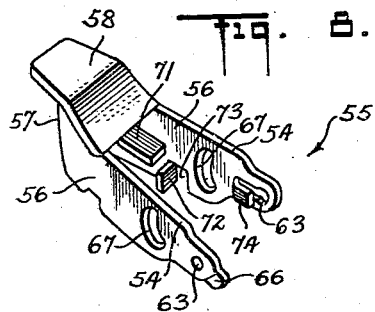
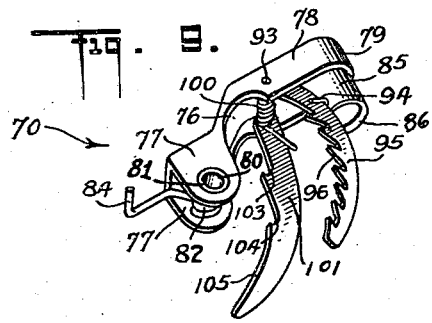
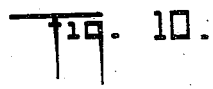
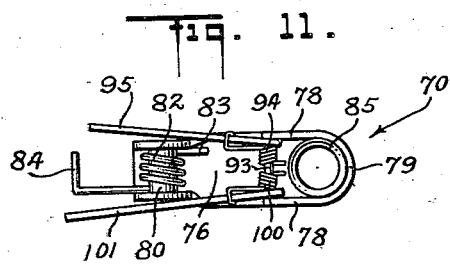
INVENTOR
Robert S. Blair
BY
ATTORNEYS Oct. 29, 1935. R. S. BLAIR 2,019,435
PYROPHORIC LIGHTER
Filed Dec. 12, 1932 3 Sheets-Sheet 3
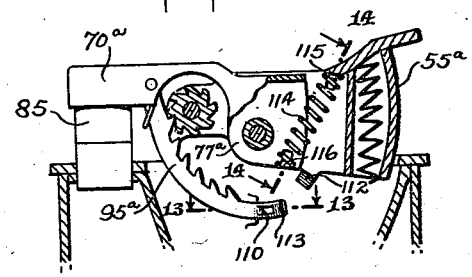
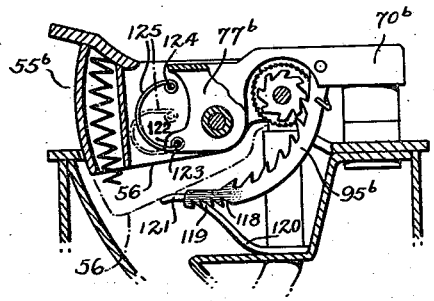
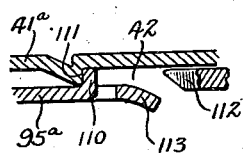
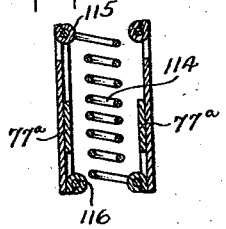
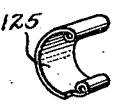
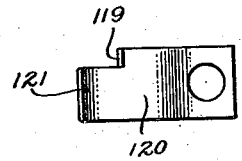
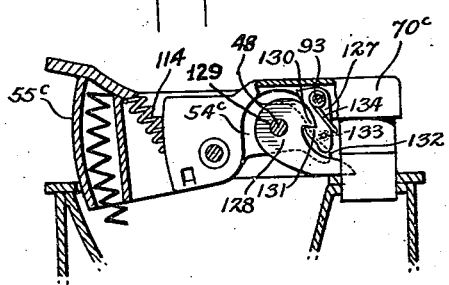
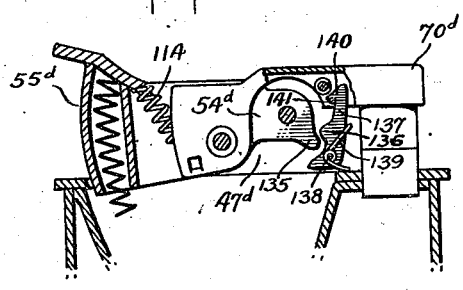
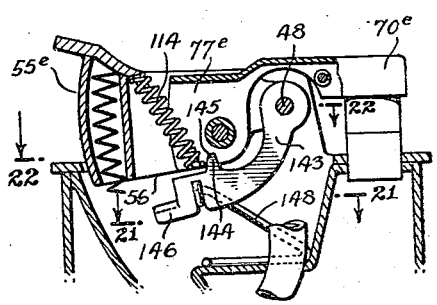
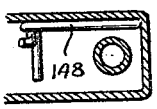
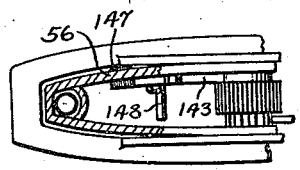
INVENTOR
Robert S. Blair
BY
Janney, Blair & Carter
ATTORNEYS Patented Oct. 29, 1935

2,019,435

UNITED STATES PATENT OFFICE 2,019,435

PYROPHORIC LIGHTER

Robert S. Blair, Stamford, Conn., assignor to Evans Case Company, North Attleboro, Mass., a corporation of Massachusetts Application December 12, 1932, Serial No. 646,754

24 Claims. (Cl. 67—7.1)

The invention relates to a pyrophoric lighter, and with regard to its more specific features to a finger piece operated lighter.

One object of the invention is to provide a lighter that shall give an extremely hot spark. Another object of the invention is to provide a lighter in which the fuel tank is well sealed when not in use. Another object of the invention is to provide an easily assembled lighter. Another object of the invention is to provide a pocket lighter operated by a finger piece in which high velocity rotation of the sparking wheel is assured. Another object of the invention is to provide a lighter of the type indicated in which a substantially constant velocity of rotation of the sparking wheel is secured. Another object of the invention is to provide a combined finger piece and spring actuated lighter of very compact construction. Another object of the invention is to provide a latch or trigger operated lighter mechanism which is extremely efficient and reliable. Other objects will be in part obvious and in part pointed out hereinafter.

The invention accordingly consists in the features of construction, combinations of elements and arrangements of parts as will be exemplified in the structure to be hereinafter described and the scope of the application of which will be indicated in the following claims.

In the accompanying drawings in which is shown several of various possible embodiments of the mechanical features of this invention, Figure 1 is a perspective view of a lighter constructed in accordance with the invention;

Figure 2 is a plan view of the lighter;

Figure 3 is a vertical sectional view taken on the line 3—3 of Figure 2, certain parts being broken away to more clearly show other parts;

Figure 4 is a fragmentary sectional view similar to Figure 3 showing the finger piece partially depressed;

Figure 5 is a view similar to Figures 3 and 4 showing the snuffer raised;

Figure 6 is a fragmentary sectional view taken on the line 6—6 of Figure 2;

Figure 7 is a vertical cross-sectional view taken on the line 7—7 of Figure 3;

Figure 8 is a perspective view of the finger piece detached from the lighter;

Figure 9 is a perspective view of the snuffer detached from the lighter;

Figure 10 is a plan view of the tank from which the operating mechanism has been removed showing two shafts upon which the mechanism may be mounted;

Figure 11 is a bottom plan view of the snuffer showing certain parts in an unusual position to more clearly disclose other parts;

Figure 12 is a fragmentary sectional view similar to Figure 3 showing a modified form of mechanism;

Figures 13 and 14 are fragmentary sectional views taken on the lines 13—13 and 14—14 respectively of Figure 12;

Figure 15 is a vertical sectional view of another modification;

Figures 16 and 17 are perspective and plan views respectively of springs used in the modification of Figure 15;

Figure 18 is a sectional view of another modification;

Figure 19 is a sectional view of another modification;

Figure 20 is a sectional view of another modification;

Figures 21 and 22 are fragmentary sectional views taken on the lines 21—21 and 22—22 respectively of Figure 20.

Similar reference characters refer to similar parts throughout the several views of the drawings.

Referring now more particularly to Figures 1, 2, and 3, I provide a fuel tank 20 which desirably consists of a pair of shells suitably fastened together as by solder, the dividing line between the shells (which is scarcely discernible in the finished article) being indicated by the dotted line 21 in Figure 1. The fuel tank 20 has a bottom wall 22 which, as better shown in Figure 3, has a pair of orifices 23 and 24. The orifice 23 is threaded and is normally closed by means of a threaded closure plug 25 having a disk-like bottom 26 provided with a knurled edge. The disc portion 26 fits in a depression 27 provided for it, which depression 27, however, is of such diameter that the knurled portion extends at the sides beyond the bottom wall 22 so that the closure 25 may be readily unscrewed. Liquid fuel is introduced into the tank 20 through the orifice 23 which thereafter may be closed by the closure 25, a leather washer 28 being provided in the depression 27 to form a tight seal. The threaded portion of the closure 25, as is clearly shown in Figure 3, is hollow and receives a container 29 for extra pieces of pyrophoric metal. As is better shown in Figure 7, the container 29 may comprise a cylindrical member split down the center with a closed top, and such member is adapted to be frictionally held in the hollow portion of the closure 25 by reason of the tendency of its side walls to expand.

Again referring to Figure 3, the orifice 24 has secured in it, desirably by solder, the lower end of a tube 30. As is better shown in Figures 6 and and 7, the tube 30 contains a spring 31 the upper end of which is coiled about the shank of a plunger 32 engaging a piece 33 of pyrophoric metal or other substance adapted to produce sparks. Referring again to Figure 3, the bottom end of the spring 31 is coiled about a knob 34 formed on the upper end of a threaded member 35 adapted to be screwed into the lower end of the tube 30 which is internally threaded for that purpose. The threaded member 35 has a knurled disc portion 36 extending beyond the sides of the bottom wall 22. Thus the screw 35, the spring 31, the plunger 32 and the pyrophoric metal 33 may be removed from the tube 30 at any time for the purpose, for example, of replacing a worn or very much reduced piece of pyrophoric metal with a fresh piece.

Referring now particularly to Figures 1, 2, and 3, the top of the fuel tank 20 is sealed by a top wall flange portion 40 which may be secured to the fuel tank by solder. As is better shown in Figures 3 and 7, extending downwardly from the top wall flange portion 40 and desirably also soldered to the shells of the fuel tank 20 as well as to the top wall flange portion 40, are the walls of a member 41 which form a somewhat irregularly shaped well 42, the sides and bottom of the well 42, the flange 40 and a short capped tube 43, the purpose of which will hereinafter be made apparent, forming the upper closure for the fuel tank 20.

The tube 30 extends through an opening 44 in the bottom wall of the member 41, and the upper end of tube 30 (see now Figures 1, 6, and 10) is supported by a platform 45 extending inwardly from the flange 40. The tube 30 is made fast to the bottom of the member 41 and the opening 44 is sealed against the escape of fuel from the tank 20 by soldering or any other suitable manner.

Referring now to Figures 1, 7 and 10, desirably formed integral with the member 41 are a pair of upwardly extending side members 47, 47. Extending between these side members 47, 47 and near the front thereof, as best shown in Figures 1 and 10, is a shaft 48, one end of which, as 49, is threaded and also shouldered, and the other end of which has a slot therein for a screw driver. The latter end fits in a hole 50 formed in one of the side plates 47, while the threaded end of the shaft 48 is screwed into a threaded hole aligned with the hole 50 in the other side member 47.

Referring now to Figures 6 and 7, journaled on the shaft 48 so as to be freely rotatable thereon is an abrasive wheel 51 which desirably has teeth 52 resembling ratchet teeth. The abrasive wheel 51 is in contact with the upper end of the pyrophoric metal 33 which is urged against the teeth 52 by means of the spring 31; when the abrasive wheel is rotated in a counter-clockwise direction as viewed in Figure 6, portions of the pyrophoric metal 33 are torn from the body thereof and form a shower of sparks directed to the right in said figure.

Referring now to Figures 2, 3, 5, 7, and 8, there are likewise freely journaled on the shaft 48 a pair of flat side arms 54, 54 forming the forward part of a finger piece member 55. This finger piece member 55 is shown in perspective in Figure 8, and consists of the aforesaid flat side arms 54, 54 joined together by skirt portions 56 and a back 57, the arms, the skirt portions and the back being desirably an integral piece. As is better shown in Figures 1, 2, and 8, resting on top of the skirt portions 56 and the back 57 is a finger engaging portion 58 which may be fastened to the said skirt and back portions as by soldering. This finger piece portion 58 closes over part of the space between the two skirt portions 56 and the back wall 57. Referring now to Figure 3, a member 59 is secured to the inside of the skirt portions 56, 56 and the finger portion 58, and all these parts together form a closure 60 for a spring 61. The bottom of the spring 61 fits in the tube 43 at the bottom of the well 42, while a rod 62 desirably fits inside the spring 61 extending at least part way up in it in order to prevent said spring from collapsing. It will thus be seen that the spring 61 maintains the finger piece 55 in the position shown in Figure 3, but that said finger piece may be readily depressed to the position shown in Figure 4 by pressure on the portion 58. The front ends of the arms 54, 54 are provided with holes 63, 63 through which the shaft 48 passes, and when the finger portion 58 is depressed the entire finger piece 55 swings downwardly about the shaft 48 as a pivot; the skirt portion 56 and the back 57 move into the well 42, and it is here noted that the shapes of the back 57 and the skirt portions 56, 56 and the opening of the well 42 are such that in any position of the finger piece 55 the well is substantially closed, thus preventing dirt from getting into the well 42.

On the front of the nearer arm 54, Figure 8, is a downwardly extending lug 66, the purpose of which will be hereinafter explained. Still referring to Figure 8, opposite each other in the arms 54, 54 of the finger piece member 55 are a pair of arcuate slots 67, 67, the curve of which is drawn on a radius extending from the pivot shaft 48, and through the slots 67 extends a shaft 68 (see now Figure 10) upon which is pivotally mounted a snuffer member 70 (see now Figure 6).

Referring again to Figure 8 and also to Figures 1 and 2, extending forwardly from the finger portion 58 and desirably formed integral with it is an operating projection 71. Referring now to Figures 3 and 8, extending inwardly from one of the skirt portions 56 is a latch operating projection 72. This projection 72 may be formed by forcing inwardly part of the metal which constitutes the skirt 56, a cutaway portion 73 being indicated in Figure 3 and representing that part of the skirt portion 56 from which the metal forming the projection 72 was deflected. In this manner manufacture of the complete finger piece 55 is facilitated. Referring to Figures 4 and 8, extending inwardly from the arm 54 which is integral with the skirt portion 56 having the latch operating projection 72 is an integral lug portion 74 the purpose of which will be hereinafter explained. This lug portion 74 is made by upsetting the metal inwardly.

The snuffer member hereinbefore referred to is generally designated by the numeral 70 and is shown in perspective in Figure 9 and in bottom plan view detached from the lighter in Figure 11 and is also illustrated, in different operating positions, in other figures. It comprises a top portion 76 merging into a pair of downwardly extending side portions 77, 77 at one end and side portions 78, 78 merging into a rounded downwardly extending front portion 79 at the other end. All the portions so far named may readily be produced from a single piece of sheet metal. The side portions 77, 77 of the snuffer member 70 fit between the side portions 54, 54 and the skirts 56, 56 of the finger piece member 55, and the pin 68 has journaled thereon a sleeve 80 which passes through holes 81, 81 in the sides 77 of the snuffer member, the sleeve being preferably secured in place by any suitable means, such as a tight fit or soldering or expanding the ends of the sleeve. Thus the snuffer member 70 is pivotally mounted on the shaft 68 which in turn is fastened to the upwardly extending side members 47, and the bearing is a wide one making the action free and involving a minimum of friction.

Referring now particularly to Figure 11, coiled around the sleeve 80 is a spring 82. One end 83 of the spring 82 extends, as shown in Figure 11, away from the sleeve 80 and is in contact with the under side of the top portion 76 of the snuffer. The other end of the spring 82 extends in the opposite direction (to the left in Figure 2) and is turned at right angles (see now Figure 11) forming a portion to be operated 84. Preferably the spring 82 is under tension and a portion of the end adjacent the portion 84 is in contact with the end of the under side of the top portion 76 when the snuffer is in closed position, as shown in Figure 3. As shown in Figures 2 and 3, the operating projection 71 extends over the portion to be operated 84 of the spring 82, and it also extends under the left hand edge (Figure 3) of the top portion 76 of the snuffer 70. The depression of the finger piece 55 from the position shown in Figure 3 to the position shown in Figure 4 causes the operating projection 71 to place the spring 82 under some tension, or additional tension, depending upon whether it was under any tension in the first place, by forcing downwardly the portion 84. In either event that portion of the spring which previously rested against the rear or left hand end (Figure 3) of the under side of the top piece 76 of the snuffer 70 is thereby removed therefrom, while the forwardly extending end 83 of the spring 82 rests against the under side of the top portion 76 of the snuffer 70 forwardly or to the right (Figure 4) of the pivot shaft 68, and as the spring 82 is under tension, there is a force exerted against the snuffer 70 tending to rotate it counter-clockwise (Figure 4) to raise a snuffer cap 85 secured to the snuffer 70. However, until the finger piece member 55 has moved to a certain position and by means hereinafter described operated or caused the operation of latch means, the snuffer 70 and snuffer cap 85 do not swing upwardly.

At the front of the snuffer member 70 and received within the downwardly extending side walls 78, 78, and a rounded front portion 79, as is clearly shown in Figures 3, 4, 5, 6, and 11, is the snuffer cap 85 which comprises a cylindrical member with a beveled lower lip 86. As best shown in Figure 3, the beveled lower lip 86 of the snuffer cap 85 is adapted to seat against a mating beveled portion 87 provided on an upwardly extending projection 88 formed on the top wall flange 40. In this projection 88 is a threaded opening 89 which extends to the inside of the fuel tank 20, and fitting in this opening is a threaded bushing 90 inside of which is a wick 91. The upper part of the wick 91 is normally received inside the snuffer cap 85, while the bottom thereof extends into the inside of the tank 20 which is desirably filled with cotton wool, not shown. When the snuffer cap 85 is in the position shown in Figure 3, the fuel is effectively sealed in the tank 20, the cap 85 bearing firmly against the seat 87 not only by reason of the pressure of the spring 61 transmitted through the operating projection 71 which bears against the under side of the top wall 76, as already described, but also because of the pressure of another spring as will be hereinafter set forth.

Referring now particularly to Figures 6 and 11, extending between the side members 78, 78 of the snuffer 70 is a pin 93 upon which pin is mounted a spring 94, one end of which presses against the bottom of the top wall 76 of the snuffer member and the other end of which is looped around a portion of an arcuate ratchet rack 95. This ratchet rack is pivotally mounted upon the pin 93 and has ratchet teeth 96 which are located on the inside of the curve in engagement, as shown in Figure 6, with a ratchet wheel 97 that is rigidly fastened to the abrasive wheel 51. The teeth 98 of the ratchet wheel face in a direction opposite to that of the teeth 52 of the abrasive wheel 51, while the teeth 96 of the ratchet rack face in a proper direction to cause rotation of said ratchet wheel when the ratchet rack 95 is moved upwardly. The ratchet rack 95 is moved upwardly whenever the snuffer cap 85 is raised, and upon such occasions the ratchet wheel 97 is rotated, thus rotating the abrasive wheel 51, the curve of the ratchet rack 95 corresponding generally to the angular movement of the pin 93 upon which it is mounted. Downward movement, however, of the ratchet rack 95, which takes place when the snuffer cap 85 is lowered, results in no rotation of the ratchet wheel 97 and the abrasive wheel 51, because at such times the teeth 96 and 98, being ratchet teeth, readily slide over each other. The tension of the spring 94 maintains the respective teeth 96 and 98 in engagement with each other, while lateral displacement of the ratchet rack 95 is prevented in part by the platform 45 and in part by the projecting portion 66 on the arm 54 of the finger piece 55, these parts acting as a guide for the ratchet rack 95. The ratchet rack 95 is located in a slot 99 (see Figure 10) located between the platform 45 and the top wall 40. The depth of this slot is preferably not sufficient to allow the ratchet rack 95 to move so far forwardly that it can clear the projection 66, and thus accidental displacement of the ratchet rack 95 is prevented. It is noted that the location of the pivot shaft 68 and of the pin 93 and the shaft 48 is such that there is a natural tendency for the teeth 96 and 98 to engage each other when the ratchet rack 95 is moved upwardly, so that a friction tending to restrain turning of the ratchet rack 95 on the pin 93 might be substituted for the spring 94 so far as certain features of the invention are concerned.

Referring now particularly to Figures 3, 4, and 5 in connection with Figures 9 and 11, mounted on the pin 93 is a second spring 100 (although one spring might be made to fulfill the functions of both springs 94 and 100) one end of which, like spring 94, is in engagement with the under side of the top portion 76 of the snuffer 70, and the other end of which is looped around a latch member 101 which is likewise pivotally mounted on the pin 93 and is urged in the same direction, as regards the snuffer member, as the ratchet rack 95, viz. in a clockwise direction (Figure 3). This latch member 101 is located in a slot 102

(see Figure 10) between the platform 45 and the top wall 40. The latch member 101 is desirably formed from sheet metal and is preferably made of hardened steel. It has a generally arcuate shape, corresponding to the shape of the arcuate ratchet rack 95, and on the inner side of the curve are located a pair of hook-like portions 103 and 104.

The integral lug portion 74 on the inside of the arm 54 of the finger piece 55 constitutes spacing means to maintain the abrasive wheel 51 away from the front edge of the arm 54, and there is thus defined between said front edge and the abrasive wheel a space in which the curved side of the latch 101 having the hooks 103 and 104 fits, by reason of the tension of the spring 100, and the latch 101 therefore bears against the shaft 48. When the snuffer 70 is in the position shown in Figure 3, the hook 103 is under the shaft 48, thus holding the snuffer 70 down, and in fact the tension of the spring 100, by forcing the hook 103 against the shaft 48 urges the snuffer cap 85 against the portion 87 thus assisting in sealing the tank 20. When the finger piece 55 is depressed, although the spring 82 is tensioned, the snuffer does not immediately rise, owing to the fact that the hook 103 by its engagement with the shaft 48 prevents it from rising. Figure 4 shows the finger piece depressed but with the snuffer still substantially in its downward position. It is here noted that there may be a slight initial movement of the snuffer cap away from portion 87 due to a partial downward movement of the finger piece 55 to the extent of the play in the parts, this condition being shown in Figure 4.

Figure 4 is representative of an intermediate position of the finger piece 55 between its extreme upper position and its extreme lower position. The lower end of the latch 101 has on the inner or upper side thereof a cam portion 105 which, pursuant to downward movement of the finger piece 55, is engaged by the latch operating projection 72. As the finger piece 55 is moved downwardly, the latch 101 is gradually rotated on the pin 93 against the tension of the spring 100 until the hook 103 has cleared the shaft 48, whereupon the snuffer 70 and all associated parts swing suddenly counter-clockwise, Figure 3, to the position shown in Figure 5, moving the ratchet rack 95 rapidly upward and thus rapidly rotating the sparking wheel 51, sending a hot shower of sparks against the wick 91. This rapid upward movement of the snuffer and consequent rapid actuation of the sparking wheel (it being noted that the angular velocity of the sparking wheel is much greater than that of the snuffer) is due to the sudden discharge of the energy stored in the spring 82 when the latch is tripped. With the construction described it is virtually certain that, if the finger piece 55 is depressed, the abrasive wheel 51 will be sufficiently rapidly rotated to produce a very hot shower of sparks. At the same time, owing to the fact that the spring 82 has no tendency to rotate anything (even if it is under initial tension) until the finger piece 55 is depressed, there is no danger of the lighter igniting in one's pocket, or accidently from any cause, it requiring a conscious act to ignite the wick 91.

Upward movement of the snuffer beyond the position illustrated in Figure 5 is prevented by the engagement of the hook 104 with the shaft 48, thus maintaining the parts in proper operating relation. When the finger piece 55 is released all the parts move together to their original position, as shown in Figure 3, and the hook 103 thereupon reengages the shaft 48. The hook 103, as well as the hook 104, is in effect a ratchet tooth, as it can readily pass into engagement with the shaft 48 in a downward direction.

Among many numerous advantages of the present construction, it is noted that the operating parts of the lighter can be readily assembled as the snuffer 70 can be inserted in position after the finger piece 55 and the wheel 51 are mounted in position on the shaft 48.

Referring now to the modification of Figures 12, 13, and 14, the ratchet rack, which is indicated in Figure 12 by the numeral 95a may have formed on one side thereof a pawl tooth 110, as more clearly shown in Figure 13. As shown in these figures this pawl tooth 110 normally engages a detent 111 formed in the side of the material 41a which defines the well 42. The finger piece member 55a has a wedge shaped portion 112 adapted to engage a portion 113 of the ratchet rack 95a when the finger piece 55a is depressed, and when these parts engage, the ratchet rack 95a is swung slightly sideways thus releasing the tooth 110 from the detent 111 and allowing the snuffer 70a to swing upwardly.

In the modification of Figure 12, the finger piece 55a may be connected to the snuffer 70a by means of a spring 114 which is fastened at 115 to the finger piece 55a and at 116 to the side portions 77a of the snuffer member 70a. This construction is more clearly shown in Figure 14, and it is noted that the connections at 115 and at 116 are both positive connections and preferably the spring 114 is in a state of equilibrium in the position shown in Figure 12, so that upward movement of the finger piece 55a will move the snuffer cap 85 downwardly. The mechanism of this modification operates substantially as in the embodiment previously described, a single member 95a, however, performing the functions of the ratchet rack 95 and the latch 101.

Referring now to Figures 15, 16, and 17, I therein show another modification in which a ratchet rack 95b has on the bottom thereof a series of teeth 118 engaging with a tooth 119 formed on a spring 120 (see now Figure 17) which is preferably made of hardened steel. Spring 120 has a tailpiece 121 which, when the finger piece 55b is depressed, is engaged by one of the skirts 56, thus unlatching the snuffer 70b. The snuffer 70b has downwardly extending side portions 77b having tailpieces 122 between which extends a pin 123, and between the skirts 56 of the finger piece 55b extends another pin 124, these pins 123 and 124 having mounted thereon a spring 125 which is best shown in Figure 16. The spring 125 serves as a connection between the finger piece 55b and the snuffer 70b and the operation of this mechanism is substantially like those already described.

Referring now to Figure 18, the snuffer 70a may be latched by means of a hook 127 mounted on the pivot pin 93, this hook 127 engaging a stationary hook 128 extending upwardly from the tank 20 and suitably secured thereto. The hook 128 has a hole 129 therein through which passes the shaft 48, and takes the place as to space and position in the mechanism occupied by the lug 74 in the first described embodiment of the invention. A hook portion 130 normally engages a hook portion 131 of the hook 127, but when a cam portion 132 on the arm 54c has moved far enough it disengages the hooks 130 and 131, being in engagement with a pin 133 projecting laterally from the hook 127. The hook 127 has a spring 134 urging it into engagement with the hook 128, said spring 134 being mounted on the shaft 93. The connection between the snuffer 70c and the finger piece 55c may be the same as already described in connection with the modifications of Figures 12, 13, and 14 in this modification of Figure 18.

Referring now to Figure 19, a cam portion 135 on the arm 54d of the finger piece 55d is adapted to engage a cam portion 136 on a hook 137 which is mounted on a pin 138 extending laterally from one of the side flanges 47d. A spring 139 urges the hook portion 140 of the hook 137 into engagement with a pin 141 extending between the side walls 78d of the snuffer 70d. Depression of the finger piece 55d causes the cam 135 to engage with the cam 136 thus moving the hook 140 away from the pin 141 and releasing the snuffer 70d. The connections between the finger piece and snuffer in this embodiment of the invention may be as already described in any previous modification or embodiment.

Referring now to Figures 20, 21, and 22, to latch the snuffer 70e in downward position there is provided a latch 143 journaled on the pin 48 in the space which as aforesaid was occupied by the lug 74 in the first described embodiment, the latch 143 having a detent 144 normally engaging a slot 145 in a downwardly extending side portion 77e of the finger piece 70e. Referring to Figure 22, there is a sideways projecting portion 147 of the latch 143 which, when the finger piece 55e is depressed is engaged by the skirt 56 thereof thus moving the detent 144 out of the slot 145. A spring 148 resting in the well 42 urges the latch 143 upwardly as shown. Any one of the previous types of spring connections between the finger piece 55e and the snuffer 70e may be used in this modification.

It will be noted that in all embodiments of the invention, any actuation of the lighter produces a rapid rotation of the sparking wheel. That is to say, once the finger piece is depressed to trip the latch, the sparking wheel will rotate rapidly, or putting it in another way the sparking wheel will rotate rapidly if at all. Furthermore the velocity of the sparking wheel is substantially constant through variations of the speed of actuation of the finger piece 55.

It will thus be seen that there has been provided by this invention an apparatus in which the various objects hereinabove set forth, together with many thoroughly practical advantages, are successfully achieved.

As many other possible embodiments may be made of the above invention, and as many changes might be made in the embodiments above set forth, it is to be understood that all matter hereinabove set forth, or shown in the accompanying drawings, is to be interpreted as illustrative and not in a limiting sense.

I claim:

1. In a lighter mechanism, the combination with a fuel tank, a sparking wheel, means mounting a piece of pyrophoric material for contact with said wheel, a wick extending into said fuel tank, a snuffer for said wick, a separate finger piece to actuate said snuffer, and a top wall for said fuel tank mounting all of said parts, of means connecting said finger piece and said snuffer including a spring, and latch means normally holding the snuffer down said latch means being biased to cause the snuffer to be pressed against a seat surrounding said wick.

2. In a lighter mechanism, the combination with a fuel tank, a sparking wheel, means mounting a piece of pyrophoric material for contact with said wheel, a wick extending into said fuel tank, a snuffer for said wick, a separate finger piece to actuate said snuffer, a ratchet wheel associated with said sparking wheel, a ratchet rack pivoted to said snuffer for actuation of said ratchet wheel, of spring means connecting said finger piece and said snuffer, and latch means associated with said ratchet rack to normally retain said snuffer in snuffing position.

3. In a lighter mechanism, the combination with a fuel receptacle, a finger piece mounted on said fuel receptacle, a separate snuffer member also mounted on said fuel receptacle, a burner, a sparking wheel adjacent said burner, means projecting pyrophoric material against said sparking wheel, a pawl mounted on said snuffer member, a ratchet wheel connected to said sparking wheel and in engagement with said pawl, a spring opposing downward movement of said finger piece, and a spring connection between said finger piece and said snuffer member whereby depression of said finger piece causes a force to be exerted on said snuffer member tending to elevate the same, of a latch pivoted to said snuffer alongside said pawl, said pawl and said latch being both elongated, a well formed in said receptacle into which said latch and said pawl both extend, and tripping means on said finger piece to trip said latch.

4. In a lighter mechanism, the combination with a fuel receptacle, a finger piece mounted on said fuel receptacle, a separate snuffer member also mounted on said fuel receptacle, a burner, a sparking wheel adjacent said burner, means projecting pyrophoric material against said sparking wheel, a pawl mounted on said snuffer member, a ratchet wheel connected to said sparking wheel and in engagement with said pawl, a spring opposing downward movement of said finger piece, and a spring connection between said finger piece and said snuffer member whereby depression of said finger piece causes a force to be exerted on said snuffer member tending to elevate the same, of a horizontal pin secured to said snuffer and upon which said pawl is mounted, a downwardly extending latch mounted on said pin, spring means urging said pawl into engagement with said ratchet, a pin mounting said finger piece, spring means urging said latch into engagement with said pin, and a trip on said finger piece to trip said latch.

5. In a lighter mechanism, the combination with a fuel tank having an elongated top wall, a wick projecting from said wall adjacent one end thereof, an abrasive wheel journaled above said wall, a pyrophoric element cooperating with said wheel, a snuffer for said wick journaled on said tank over said wall, an actuating lever for said wheel fulcrumed on the axis of the wheel, and means acting to multiply the movement of the wheel relative to the movement of the lever, of a spring connection between the lever and the wheel, a latch normally preventing the wheel from rotating, and tripping means operated by the lever to release the latch when the lever is moved to a certain position to allow the wheel to be rotated by said spring means.

6. In a lighter mechanism, a fuel receptacle, a finger piece mounted on said fuel receptacle for downward movement thereon, a separate snuffer member, a burner, an abrasive wheel adjacent said burner, an axis pin for said abrasive wheel, spring means connecting said finger piece and said snuffer, a latch pivotally mounted on said snuffer and having two notches, one notch engaging the axis pin when the snuffer is covering said burner, and the other notch engaging said axis pin when the snuffer is elevated, and a trip operated by said finger piece to swing the latch to disengage the first-named notch from said axis pin.

7. In a lighter mechanism, a fuel tank having an elongated top wall, a relatively wide cavity formed in said wall adjacent one end thereof, a pair of relatively narrow cavities in said wall extending from said wide cavity toward the opposite end of the wall, a burner on said wall adjacent said opposite end, a manually operable actuating lever member revolubly mounted on a shaft supported on said tank above said top wall and adapted to have one end portion thereof depressed into said wide cavity when said portion is manually depressed, a separate snuffer member pivotally mounted on a second shaft supported by said tank said snuffer member fitting over said burner in one position thereof, an abrasive wheel journaled on one of said shafts, a ratchet operatively connected to said wheel, a multi-toothed pawl pivotally mounted on said snuffer member and projecting into one of said narrow cavities in engagement with said ratchet wheel, a latch pivotally mounted on said snuffer member projecting into the other of said narrow cavities and having a portion in engagement with one of said shafts, a spring connection between said snuffer and said lever, and a trip formed on said lever to trip said latch.

8. In a lighter mechanism, the combination with a fuel tank, a wick projecting from said tank, an abrasive wheel mounted on said tank, a pyrophoric element cooperating with said wheel, a pair of crossed levers the fulcrum point of each located nearer the free end of the other than is the fulcrum point of the other mounted for movement on said tank, one of said levers forming a finger piece and the other a snuffer arm, a snuffer for said wick on said arm, and a spring connecting said finger piece and said snuffer, of a latching member pivotally mounted on said snuffer and extending downwardly and toward the remote end of said finger piece beyond the axis of said snuffer, and tripping means mounted on said finger piece to engage said latch.

9. In a lighter mechanism, in combination, a fuel receptacle having a wick projecting therefrom, an abrasive wheel rotatably carried by said receptacle adjacent said wick, a pyrophoric element cooperating with said wheel, a movable member carried by said receptacle and having connections with said wheel for driving the latter, a pretensioned spring having its two ends, through which the energy of the spring tends to exert itself, engaging said movable member, thereby to maintain said spring in pre-tensioned condition, a finger piece movably carried by said receptacle and positioned to engage one spring end and, upon movement of said finger piece, to move it out of engagement with said movable member and in a direction further to tension said spring, and means released upon a certain movement of said finger piece and acting normally to prevent driving of said wheel.

10. In a lighter mechanism, in combination, a fuel receptacle having a wick projecting therefrom, an abrasive wheel rotatably carried by said receptacle and positioned near said wick, a pyrophoric element cooperating with said wheel, a snuffer for said wick, a movable member carried by said receptacle for controlling the position of said snuffer relative to said wick, a pre-tensioned spring having its ends engaged by said movable member, thereby to retain the energy stored in said spring, a finger piece movably carried by said receptacle and having means for engaging one end of said spring, thereby to move said one end out of engagement with said movable member and thereby further to tension said spring, means holding said movable member against movement but only until a certain further tensioning of said spring has taken place, whereby the force of the spring, through said movable member, is effective to move said snuffer into wick-uncovering position, and means whereby said wheel is rotated to throw sparks upon the uncovered wick.

11. In a lighter mechanism, in combination, a fuel receptacle having a wick, an abrasive wheel adjacent said wick, movable snuffer means for said wick, a ratchet wheel for driving said abrasive wheel, means including a spring to move said snuffer means into wick-uncovering position, pawl means carried by said snuffer means and engaging said ratchet wheel for rotating said abrasive wheel upon said snuffer means moving in wick-uncovering direction, a stop carried by said receptacle, and latch means movable with said snuffer means and having two notches, one notch engaging said stop when said snuffer means is in wick-covering position, and the other notch engaging said stop when said snuffer means is in wick-uncovering position and thereby limits movement of said snuffer means in a direction away from said wick.

12. In a lighter mechanism, in combination, a fuel receptacle having a wick, an abrasive wheel adjacent said wick, movable snuffer means for said wick, a ratchet wheel for driving said abrasive wheel, means including a spring to move said snuffer means into wick-uncovering position, an elongated multi-toothed pawl pivotally carried by said snuffer means and spring-pressed into engagement with said ratchet wheel, and latch means having two positions of effectiveness, said latch means in one of its said positions holding said snuffer means in wick-covering position and in its other position limiting the range of movement of said snuffer means away from said wick and thereby preventing said multi-toothed pawl from riding out of engagement with said ratchet wheel.

13. In construction for lighters and the like, in combination, a fuel tank having an elongated top closure wall, a pair of levers overlying and extending along said top wall and mounted for pivotal movement with respect thereto, each lever having a top portion and depending side portions, the top portions of said levers normally extending substantially parallel to said top wall, the top portion of one of said levers forming a finger piece, whereby the lever may be depressed, and the other of said levers forming a snuffer arm, a snuffer carried by said snuffer arm lever at the free end thereof, a wick projecting through said top wall at one end thereof and in position to be covered by said snuffer, an abrasive wheel mounted above said top wall intermediate the ends of the latter and between depending side portions of one of said levers and intermediate the free ends of said levers, a pyrophoric element projecting upwardly through said top wall into contact with said wheel, latch means for holding said snuffer arm lever against upward swinging thereof, a driving connection between said snuffer arm lever and abrasive wheel, spring means interposed between said two levers whereby, upon said finger piece lever being depressed, energy is stored in said spring means, and means operating after a certain amount of energy has been stored in said spring means for releasing said latch means and thereby to cause said snuffer arm lever to swing upwardly to uncover the wick and said driving connection to rotate said wheel against said pyrophoric element.

14. In construction for lighters and the like, in combination, a fuel tank having an elongated top closure wall, a pair of levers overlying and extending along said top wall and mounted for pivotal movement with respect thereto, each lever having a top portion and depending side portions, the top portions of said levers normally extending substantially parallel to said top wall, the top portion of one of said levers forming a finger piece, whereby the lever may be depressed, and the other of said levers forming a snuffer arm, a snuffer carried by said snuffer arm lever at the free end thereof, a wick projecting through said top wall at one end thereof and in position to be covered by said snuffer, an abrasive wheel mounted above said top wall intermediate the ends of the latter and between depending side portions of one of said levers and intermediate the free ends of said levers, a pyrophoric element projecting upwardly through said top wall into contact with said wheel, and operating connections between said finger piece lever, said snuffer arm lever, and said abrasive wheel, said connections including latch means for holding said wheel against rotation and spring means adapted to be tensioned upon depression of said finger piece lever, and means for releasing said latch means in response to a certain movement of said finger piece lever, whereby said wheel is rotated by energy released from said spring means and said snuffer lever is swung upwardly.

15. In construction for lighters and the like, in combination, a fuel tank having an elongated top closure wall, a pair of levers overlying and extending along said top wall and mounted for pivotal movement with respect thereto, each lever having a top portion and depending side portions, the top portions of said levers normally extending substantially parallel to said top wall, the top portion of one of said levers forming a finger piece, whereby the lever may be depressed, and the other of said levers forming a snuffer arm, a snuffer carried by said snuffer arm lever at the free end thereof, a wick projecting through said top wall at one end thereof and in position to be covered by said snuffer, an abrasive wheel mounted above said top wall intermediate the ends of the latter and between depending side portions of one of said levers and intermediate the free ends of said levers, the axis of said wheel being spaced from the pivot of said snuffer arm lever, a pyrophoric element projecting upwardly through said top wall into contact with said wheel, said snuffer arm lever having a greater angular movement than said finger piece lever, latch means for holding said snuffer lever with said snuffer in wick-covering position, a one-way driving connection between said snuffer lever and said wheel, spring means interposed between said two levers for having energy stored therein upon depression of said finger piece lever, and means responsive to actuation of the latter for releasing said latch means and thereby release the energy of said spring means.

16. In construction for lighters and the like, in combination, a receptacle of elongated cross-section for containing fuel and having a wick projecting upwardly therefrom at one end thereof, said receptacle having a well at the other end thereof and open from the top of the receptacle, a finger piece member movably mounted at the top of said receptacle and having a part that enters said well upon depression of said finger piece, a spring accommodated between said finger piece and a lower wall of said well for holding said finger piece in upward position, a snuffer member pivotally mounted at the top of said receptacle and normally closing over said wick, an abrasive wheel rotatably mounted at the top of said receptacle and adjacent said wick and having a pyrophoric member operatively related thereto, a driving connection between said snuffer member and said wheel whereby the latter is operated upon upward swinging of said snuffer member, latch means extending into said well for normally holding said snuffer member in wick-covering position, spring means interposed between said finger piece and said snuffer member for being tensioned upon depression of said finger piece, and means whereby said finger piece part that extends into said well effects release of said latch means after a certain downward movement of said finger piece.

17. In a lighter mechanism, the combination with a fuel tank, a shaft on the top of said fuel tank, a sparking wheel mounted on said shaft, means mounting a piece of pyrophoric material for contact with said wheel, a wick extending into said fuel tank, and a snuffer for said wick, of spring means to raise said snuffer, manually operable means for tensioning said spring means, and latch means operatively connected to said snuffer and coacting with said shaft for holding said snuffer against the action of said spring means, said latch means having a portion which, upon movement of said latch means in one direction, is in engagement with said shaft and holds said snuffer against the action of said spring means and which, upon movement in another direction, disengages said shaft to subject said snuffer to the action of said spring means.

18. In a lighter mechanism, the combination with a fuel receptacle, a downwardly movable finger piece mounted on said fuel receptacle and above the top wall of the latter and to one side of the center of said top wall, a separate snuffer member also mounted on said fuel receptacle and above the top wall of the latter and to the other side of the center thereof, a burner positioned to be covered by said snuffer member when the latter is in snuffing position, a sparking wheel adjacent said burner, means projecting pyrophoric material against said sparking wheel, a pawl mounted on said snuffer member, a ratchet wheel connected to said sparking wheel and in engagement with said pawl, a spring opposing downward movement of said finger piece, and a spring connection between said finger piece and said snuffer member whereby depression of said finger piece causes energy to be stored in said spring connection and the latter causes a force to be exerted on said snuffer member tending to elevate the same, of latching means extending between the receptacle and the snuffer member for preventing elevation of said snuffer member, and means operative only after substantial downward movement of the finger piece to release said latching means.

19. In a lighter mechanism, the combination with a fuel receptacle, a downwardly movable finger piece mounted on said fuel receptacle and above the top wall of the latter and to one side of the center of said top wall, a separate snuffer member also mounted on said fuel receptacle and above the said top wall of the latter and to the other side of the center thereof, a burner positioned to be covered by said snuffer member when the latter is in snuffing position, a sparking wheel adjacent said burner, means projecting pyrophoric material against said sparking wheel, a pawl mounted on said snuffer member, a ratchet wheel connected to said sparking wheel and in engagement with said pawl, a spring opposing downward movement of said finger piece, and a spring connection between said finger piece and said snuffer member whereby depression of said finger piece causes energy to be stored in said spring connection and the latter causes a force to be exerted on said snuffer member tending to elevate the same, of a latch extending between the snuffer member and the receptacle pivoted to one of said parts and in latching engagement with the other of said parts for preventing elevation of said snuffer member, and a trip for said latch formed on said finger piece for tripping said latch only after a certain downward movement of the finger piece and hence after a certain amount of energy has been stored in said spring connection have taken place.

20. In a lighter mechanism, a fuel receptacle having upwardly extending side walls above the top wall of said receptacle, a shaft extending between said side walls, an abrasive wheel mounted on said shaft, a pyrophoric member holding tube below said wheel extending upwardly from within said receptacle and through said top wall, said top wall being shaped to form a well extending downwardly and to each side of said holding tube, a burner, a snuffer for said burner which in closed position covers said wheel, a ratchet wheel affixed to said abrasive wheel, means including a spring to move said snuffer upwardly and a finger piece to tension said spring, a multi-toothed pawl mounted on said snuffer and extending into that portion of said well that is on one side of said tube, and a latch connected to said snuffer and extending into that portion of said well that is on the other side of said tube, and means to operate said latch to release said snuffer whereupon said multi-toothed pawl rotates said ratchet and abrasive wheels.

21. In a lighter mechanism, a fuel receptacle, a finger piece mounted on top of said fuel receptacle, a snuffer member pivotally mounted on top of said fuel receptacle, and a torsional spring having two portions thereof engaging said snuffer member under tension to exert forces that are taken up by said snuffer member so long as both of said portions engage said snuffer member, said tensioned spring having a further portion in a position to be engaged by said finger piece when the latter is moved, whereby, when said finger piece moves said further portion, one of said two portions is moved out of engagement with said snuffer member and said spring is further tensioned as said finger piece continues to move.

22. In lighter construction, in combination, a receptacle for containing fuel and having a wick exposed therefrom in an upper portion thereof, a snuffer cap for said wick, a lever member pivotally carried by said receptacle and carrying said snuffer cap for movement thereof into or out of wick-covering position, an abrasive wheel rotatably carried by said receptacle and adjacent said wick and having a pyrophoric member operatively related thereto, a driving connection between said lever member and said wheel whereby the latter is operated upon as said lever member swings said snuffer cap into wick-uncovering position, latch means for holding said lever member against movement in wick-uncovering direction, a reciprocable finger piece carried by said receptacle and movable adjacent to that end of said lever member remote from said snuffer cap, said lever member having spring means connected with it for effecting movement thereof upon release of said latch means and said finger piece having a part which engages between a rigid portion of said lever member and a yielding part of said spring means, a spring opposing movement of said finger piece in one direction and acting normally to force said finger piece part against said rigid portion of said snuffer lever and thereby force said snuffer cap against said wick, and means for releasing said latch means in response to a certain movement of said finger piece in its other direction of movement, during which movement said finger piece part effects tensioning of said spring means, said lever member and said wheel being swung, after release of said latch means, by energy released from said spring means.

23. In lighter construction, in combination, a receptacle for fuel and having a wick exposed therefrom, a lever carrying a snuffer cap, a shaft for pivoting said lever to said receptacle for movement of said snuffer cap into or out of wick-covering position, a rotatable abrasive wheel adjacent said wick and having a pyrophoric member operatively related thereto, a coiled spring extending about said shaft and having one end thereof in engagement with said lever, a movable finger piece carried by said receptacle and having an operative engagement with the other end of said spring, whereby said spring may be tensioned upon movement of said finger piece in one direction, latch means for holding said lever against movement in wick-uncovering direction, means for tripping said latch means after said finger piece has tensioned said spring to a certain extent, and means responsive to movement of said lever for rotating said wheel.

24. A lighter construction as claimed in claim 2 in which the latch means comprise a latch member on the ratchet rack and a coacting latch member carried by a fixed part of said fuel tank, and means responsive to movement of said finger piece for disconnecting said latch members after a certain movement of the finger piece has taken place.

ROBERT S. BLAIR.